United States Patent [19]

Yukishige et al.

[11] Patent Number: 4,546,840
[45] Date of Patent: Oct. 15, 1985

[54] TRAVELLING VEHICLE EQUIPPED WITH OBSTACLE DETECTOR SENSORS

[75] Inventors: Yoshifumi Yukishige; Kazuo Toyokuni; Yoshizo Kuroiwa, all of Sakai, Japan

[73] Assignee: Kubota, Ltd., Japan

[21] Appl. No.: 494,017

[22] Filed: May 12, 1983

[30] Foreign Application Priority Data

Jun. 11, 1982 [JP] Japan ................. 57-101150

[51] Int. Cl.$^4$ ........................ B60K 28/00; B60K 41/02
[52] U.S. Cl. .................... 180/169; 180/279; 200/61.44; 293/2
[58] Field of Search ............... 180/169, 274, 275, 277, 180/279; 293/2, 4, 117; 200/61.44, 61.43, DIG. 10, DIG. 46, 264

[56] References Cited

U.S. PATENT DOCUMENTS

| 1,595,068 | 8/1926 | Booth | 293/2 |
| 2,729,299 | 1/1956 | Rink | 180/274 |
| 2,920,713 | 1/1960 | Paradise | 293/4 X |
| 3,011,580 | 12/1961 | Reid | 343/7 VM |
| 3,370,166 | 2/1968 | DaRold et al. | 180/169 X |
| 3,496,317 | 2/1970 | Reed | 200/DIG. 10 |
| 3,744,586 | 7/1973 | Leinauer | 180/169 X |
| 4,030,380 | 6/1977 | Mutter | 180/274 X |
| 4,102,426 | 7/1978 | Walden | 180/169 |
| 4,308,536 | 12/1981 | Sims et al. | 343/7 VM |

FOREIGN PATENT DOCUMENTS

| 2447859 | 4/1976 | Fed. Rep. of Germany | 180/274 |
| 836126 | 6/1960 | United Kingdom | 293/4 |

Primary Examiner—Joseph F. Peters, Jr.
Assistant Examiner—Mark C. Dukes
Attorney, Agent, or Firm—Cushman, Darby & Cushman

[57] ABSTRACT

A travelling vehicle equipped with obstacle detector sensors having, at the front of the vehicle body (1), a noncontact-type obstacle detector sensor (A) and a contact-type obstacle detector sensor (B), and a vehicle speed control device (20) adapted to automatically reduce the vehicle speed from a preset vehicle speed ($v_0$) to a predetermined vehicle speed ($v_1$) when the noncontact-type obstacle detector sensor (A) detects an obstacle, adapted to automatically reset the vehicle speed to said preset speed ($v_0$) when the sensor (A) does not detect the obstacle any more during such speed reduction, and adapted to automatically stop the travelling of the vehicle immediately when the contact-type obstacle detector sensor (B) detects the obstacle.

11 Claims, 4 Drawing Figures

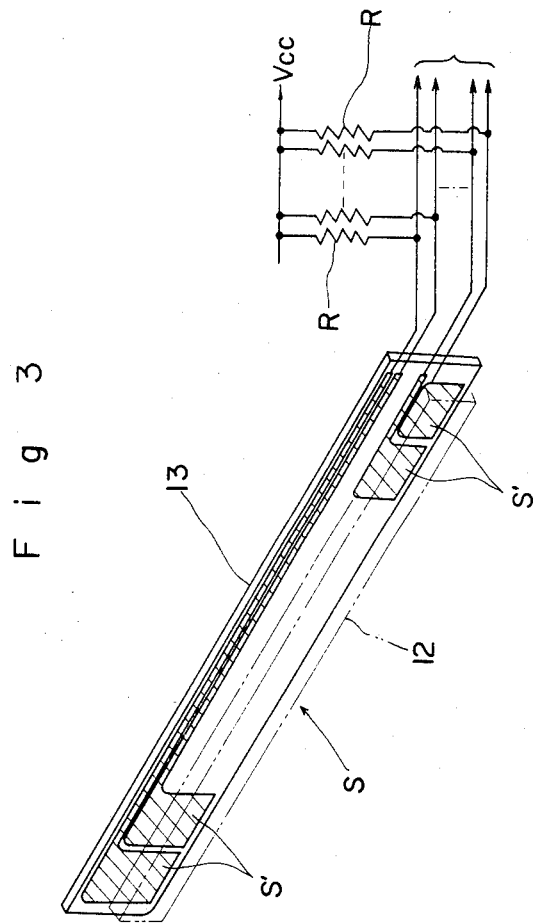
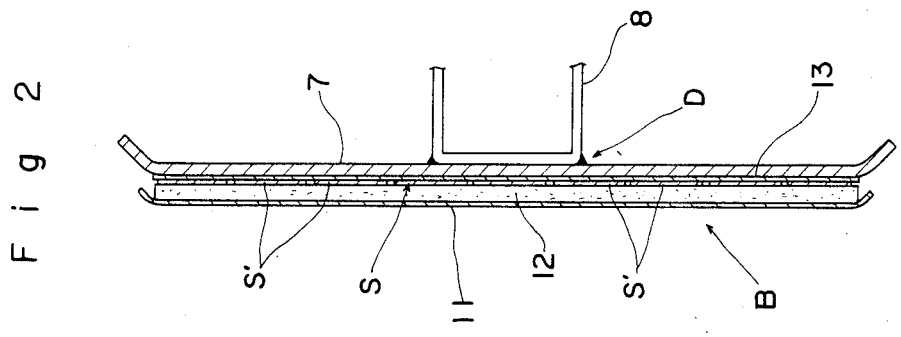

TRAVELLING VEHICLE EQUIPPED WITH OBSTACLE DETECTOR SENSORS

BACKGROUND OF THE INVENTION

1. Field of the Invention

The present invention relates to a travelling vehicle equipped with obstacle detector sensors.

2. Description of the Prior Art

A conventional travelling vehicle equipped with obstacle detector sensors, for example a mowing machine vehicle of the automatic travelling type, generally requires means for sensing an obstacle potentially located forward with respect to the travelling vehicle to stop the vehicle body, thereby to avert danger or collision. Such means inevitably need sensors capable of accurately and reliably sensing the presence of an obstacle. Noncontact-type sensors, such as photo-sensors or ultrasonic sensors, and contact-type sensors for mechanically sensing an obstacle with the use of bumpers or feeler bars are known. Such conventional sensors, however, present inconveniences as will be described below.

In the noncontact-type sensors, design considerations are made not only to provide a long and safe braking distance between the obstacle detection and vehicle travelling stop positions, but also to allow a certain latitude in the obstacle detectable range. Accordingly, there arises the possibility of an obstacle being detected to stop the vehicle travelling at an unnecessarily remote position, thereby lowering the working efficiency of the vehicle.

On the other hand, a contact-type sensor is structurally designed so as to sense an obstacle by mechanically contacting the obstacle. Therefore, when the sensor comes into contact with an obstacle with the vehicle travelling at a high speed, the vehicle cannot be immediately stopped thereby causing potential danger. Moreover, conventional contact-type sensors require a complicated structure so as to safely absorb the mechanical shock when the vehicle comes into contact with an obstacle.

SUMMARY OF THE INVENTION

In view of the foregoing, it is an object of the present invention to provide an efficient travelling vehicle equipped with obstacle sensors, having a wide obstacle detectable range and capable of being safely stopped even if it comes in contact with a man.

In order to achieve the object above-mentioned, the travelling vehicle equipped with obstacle sensors in accordance with the present invention comprises, at the front thereof, a noncontact-type obstacle detector sensor and a contact-type obstacle detector sensor, and a travelling speed control device adapted to automatically reduce the vehicle speed from a preset speed to a predetermined speed when the noncontact-type obstacle detector sensor detects an obstacle. The contact device is also adapted to automatically reset the vehicle speed to the preset speed when the sensor does not detect the obstacle during such speed reduction, and automatically stops the travelling of the vehicle immediately when the contact-type obstacle detector sensor detects an obstacle.

According to the characteristic structure above-mentioned of the present invention, the following excellent effects can be produced.

When a moving obstacle, for example a man or animal, is detected, the travelling vehicle of the present invention is not immediately stopped but rather slowed down to a safe speed thereby minimizing danger even should the vehicle come into contact with the obstacle. Meanwhile, if the obstacle moves to the outside of the detectable range, the vehicle speed is automatically reset to the initial travelling speed, thus preventing decrease in working efficiency. Should the vehicle come in contact with the obstacle, the mechanical shock of such contact is very small since the vehicle has been slowed down to a speed at which the vehicle can be immediately stopped. There is thus no possibility of the obstacle and the vehicle being damaged, thereby enhancing safety.

Other objects and advantages of the present invention will be apparent from the following description.

BRIEF DESCRIPTION OF THE DRAWINGS

FIG. 2 is a section view in plan elevation of a contact sensor B;

FIG. 3 is a perspective view of a switch mechanism S; and

DESCRIPTION OF THE PREFERRED EMBODIMENT

Figure 1:
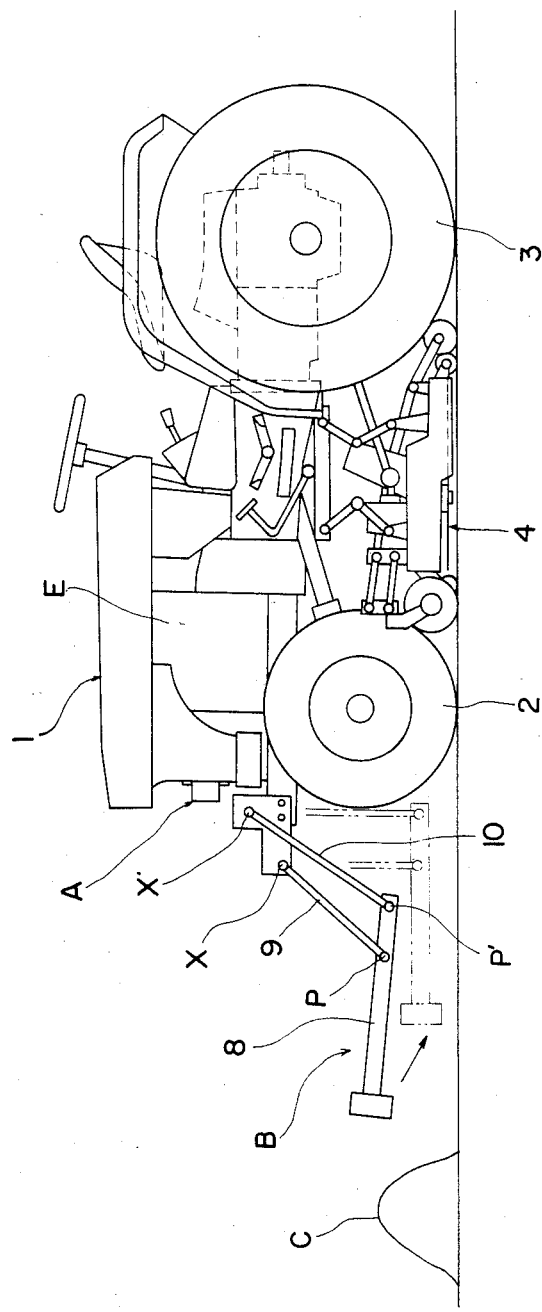
FIG. 1 is a general side view of travelling vehicle equipped with obstacle detector sensors in accordance with the present invention.

FIG. 1 illustrates a mowing machine vehicle of the automatic travelling type having a vertically movable mowing device 4 which is suspended between the front wheels 2 and the rear wheels 3 of a vehicle body 1 and incorporates a disk-shape mowing blade. An ultrasonic sensor A as a noncontact-type obstacle detector sensor (the construction of which will be discussed later) and a contact sensor B simultaneously forming a bumper as a contact-type obstacle detector sensor are both disposed at the front of the vehicle body 1.

The ultrasonic sensor A has an oscillator 5 for intermittently oscillating an ultrasonic wave in the forward direction of the vehicle body 1, and a receiver 6 for receiving a catoptric wave from an obstacle C. The sensor A is so constructed as to sense an obstacle potentially located forward with respect to the vehicle body 1, according to the reception of a catoptric wave by the receiver 6.

A support frame 8 is secured to a bumper 7 at the substantially center portion D of the latter for supporting contact sensor B in advance of the vehicle body 1. Frame 8, is in turn, supported by parallel links 9 and 10 each having one end thereof pivotally connected to frame 8 at axes P and P', respectively, and the other end thereof pivotally supported by the vehicle body 1 at axes X and X'. The axis X' of the link 10 is located above the axis X of the link 9.

When the bumper 7 comes in contact with an obstacle C, the support frame 8 and the parallel links 9 and 10 are relatively rotated around the axes X,X',P and P', and moved backward in a long elliptical orbit on which the bumper 7 is moved substantially in a straight line.

Thus, a shock given by such contact is absorbed and the obstacle C is sensed.

As shown in FIGS. 2 and 3, the obstacle sensor mechanism includes a switch mechanism S simultaneously forming a damper of the bumper 7. The description hereinafter will discuss the construction of the switch mechanism S.

Disposed on the front surface (i.e. obstacle contact surface) of the bumper member 7 are a conductive rubber member 12, the front surface of which is covered with a protective thin metallic film 11, and an electrode plate 13 having divided electrode faces s' in surface-contact with the conductive rubber 12 such that the conductive rubber 12 is sandwiched between the metallic film 11 and the electrode plate 13. The conductive rubber 12 is electrically grounded through the metallic film 11, and a power voltage (Vcc) is applied to the respective electrode faces s' of the electrode plate 13 through resistance members R. The conductive rubber 12 and the electrode plate 13 thus form the switch mechanism S.

When an obstacle C comes in contact with the front surface of the metallic film 11, such contact produces a pressure which causes the entire bumper 7 to be moved backward, thus absorbing a shock given by the contact. When obstacle C contacts film 11, a compressive is also given to that portion of the conductive rubber member 12 located opposite to the contact portion of the metallic film 11. The electrical resistance of that portion of the conductive rubber 12 compressed by the pressure of the obstacle contact is thus lowered as compared to resistance members R. Under compression of rubber member 12 therefore the corresponding electrode surface s' is then electrically grounded through that portion of the conductive rubber 12 having a decreased resistance thereby causing the electric potential of the electrode surface s' to be lowered. The lowered potential of electrode surfaces ' thus permits the presence of obstacle C to be sensed.

As discussed earlier, the electrode plate 13 has a plurality of electrode surfaces s' arranged in the transverse direction of the vehicle body 1. In such a manner, the position of the obstacle C relative to the transverse direction of the vehicle body 1 can be sensed in dependence upon those electrode surfaces s' whose electrical potential has decreased.

The use of the conductive rubber member 12 as a contact in the switch mechanism S not only simplifies the structure of the switch mechanism S, but also eliminates provision of moving parts, thereby greatly reducing maintenance troubles while enhancing reliability.

Moreover, when the conductive rubber 12 works as a damper of the contact sensor B, its resiliency is very useful to absorb the mechanical shock of contact with obstacle C.

Figure 4:
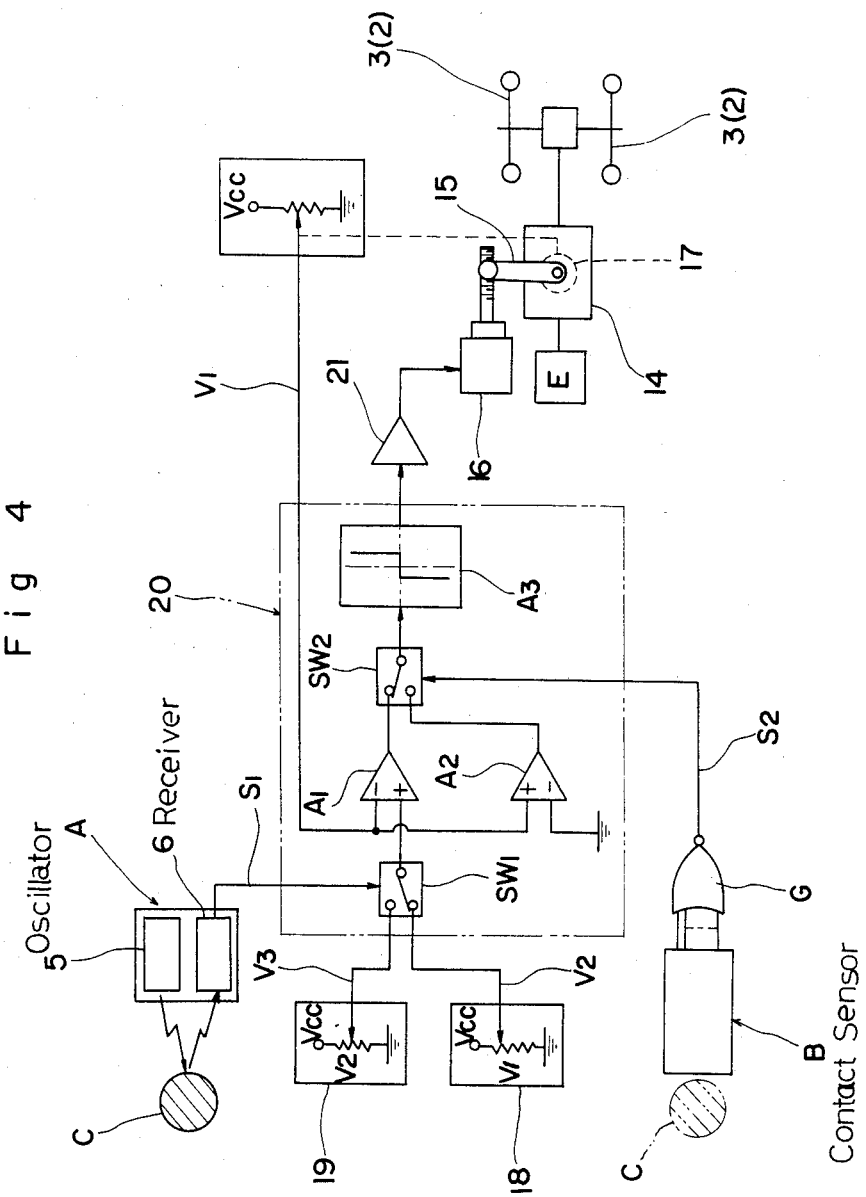
FIG. 4 is a block diagram of a control mechanism.

The description hereinafter will discuss the control mechanism for controlling the vehicle speed according to obstacle detections of the sensors A and B with reference to FIG. 4.

In a power transmission mechanism in which power from an engine E is transmitted to the front wheels 2 and/or the rear wheels 3 through a hydraulic stepless speed change device 14, the vehicle speed may be controlled by a speed change lever 15 of the speed change device 14 to be swingingly operated by a DC motor 16. The speed change lever 15 has a speed detector 17 using a potentiometer adapted to output an electric potential $V_1$ corresponding to the position of lever 15 or vehicle speed.

A vehicle working speed setting device 18 for setting a desired reference speed $v_1$ and generating a reference voltage $V_2$ corresponding to the vehicle speed $v_1$, and a reduced speed setting device 19 for setting a reduced reference speed $v_2$ and generating a reference voltage $V_3$ and corresponding to the reduced speed $v_2$ are also provided.

Control device 20 is so constructed as to actuate the DC motor 16 to provide a predetermined vehicle speed, through an amplifier 21, according to the electric potentials $V_1$, $V_2$ and $V_3$ and obstacle detector signals $S_1$ and $S_2$ from the sensors A and B.

The description hereinafter will discuss in detail the construction and operation of the control device 20.

The control device 20 has two analogue switches $SW_1$ and $SW_2$, two differential amplifiers $A_1$ and $A_2$, and a comparator $A_3$ for generating an electric potential having the same polarity as that of an input potential when the input potential exceeds a predetermined potential.

An output voltage $V_1$ from the speed detector 17 is supplied to one input terminal (−) of the first differential amplifier $A_1$ and one input terminal (+) of the second differential amplifier $A_2$ having the other input terminal (−) which is grounded.

Provision is made such that an output voltage $V_2$ or $V_3$ from the working speed setting device 18 or the reduced speed setting device 19 is selectively supplied to the other input terminal (+) of the first differential amplifier $A_1$ through the first analogue switch $SW_1$ controlled by an output signal $S_1$ of the receiver 6 in the noncontact-type sensor A.

Provision is also made such that output of the first or second differential amplifier $A_1$ or $A_2$ is selectively supplied to the comparator $A_3$ through the second analogue switch $SW_2$ controlled by an output signal $S_2$ given out through an NOR circuit G to which outputs of the respective electrodes s' of the contact sensor B are supplied.

The control device 20 constructed as above-mentioned will operate as stated below.

When a normal operation is made with the sensors A and B both not detecting an obstacle C, a difference voltage $V_2-V_1$ between a voltage $V_2$ preset by the working speed setting device 18 and a voltage $V_1$ from the vehicle speed detector 17, is supplied to the comparator $A_3$ through the first differential amplifier $A_1$. Then, a voltage having the same polarity as that of this difference voltage $V_2-V_1$ is sent to the motor 16 through the amplifier 21. The motor 16 is then rotated in such a direction as to bring this difference voltage $V_2-V_1$ to zero, so as to swing the speed change lever 15. As the result, the vehicle body 1 effects a constant travelling at the preset speed $v_1$.

When the noncontact-type sensor A detects an obstacle C during the vehicle travels, a high-level signal $S_1$ is given out from the receiver 6, so that the first switch $SW_1$ switches the input voltage of the first differential amplifier $A_1$. The first differential amplifier $A_1$ then gives out a difference voltage $V_3-V_1$ between an output voltage $V_3$ of the reduced speed setting device 19 and an output voltage $V_1$ of the speed detector 17. The motor 16 rotates in such a direction as to bring this difference voltage $V_3-V_1$ to zero. As the result, the travelling speed is reduced from the preset speed $v_1$ to the reduced speed $v_2$. Meanwhile, when the sensor A does not detect the obstacle C any more, the switch $SW_1$ is automatically resert to the side of the working speed setting device 18, so that the vehicle speed is automatically reset to the original preset speed $v_1$.

When the contact sensor B detects an obstacle C, one of the electrode surfaces s' of the switch mechanism S is grounded, so that the NOR circuit G gives out a high-level signal $S_2$ and the second switch $SW_2$ is switched. An output of the second differential amplifier $A_2$ is then supplied to the comparator $A_3$ and the motor 16 is operated by the output of the amplifier $A_2$. Since said other input terminal (−) of the amplifier $A_2$ is grounded, an output voltage of this amplifier $A_2$ coincides with an output voltage $V_1$ of the speed detector 17. The motor 16 is rotated in such a direction to bring this voltage $V_1$ to zero, so that the speed change lever 15 is unconditionally reset to the neutral position or vehicle travelling stop position, thereby to stop the travelling of the vehicle body 1.

In the embodiment discussed hereinbefore, the description has been made on condition that, when the output voltage $V_1$ of the speed detector 17 is zero, the vehicle speed becomes zero to stop the travelling of the vehicle body. However, when the speed change device 14 is constructed so as to be switched to rearward travelling and the voltage $V_1$ becomes a predetermined voltage $V'$ representing a vehicle stop position with the speed change lever 15 located at the neutral position, said other input terminal (−) of the second differential amplifier $A_2$ is not grounded as done in the embodiment abovementioned, but a voltage having the same potential as that of the voltage $V'$ is supplied to said other input terminal (−) of the second differential amplifier $A_2$. With such arrangement, the control device 20 can be operated in the same manner as that in the embodiment above-mentioned.

We claim:

1. A travelling vehicle equipped with obstacle detector sensors comprising:
   a noncontact-type obstacle detector sensor;
   a contact-type obstacle detector sensor including an electrically conductive rubber member having opposing faces, an electrically grounded metallic film covering one face of said rubber member, and an electrode plate having an electrode face in surface contact with another one of said faces of said rubber member; and
   vehicle speed control means for automatically (a) reducing the vehicle speed from a preset vehicle speed ($v_0$) to a predetermined vehicle speed ($v_1$) when said noncontact-type obstacle detector sensor detects an obstacle, (b) resetting the vehicle speed to said present vehicle speed ($v_0$) when said noncontact-type obstacle detector sensor ceases detection of the obstacle and (c) stopping said vehicle immediately when said contact-type obstacle detector sensor detects the obstacle.

2. A travelling vehicle as in claim 1, wherein said noncontact-type obstacle detector sensor includes an ultrasonic sensor.

3. A travelling vehicle as in claim 1, wherein said electrode plate includes means for dividing said electrode plate into a plurality of discrete electrode surfaces in surface-contact with said conductive rubber member.

4. A travelling vehicle as in claim 1 further comprising mounting means for mounting said contact-type obstacle sensor forwardly of said vehicle.

5. A travelling vehicle as in claim 4 wherein said mounting means includes linkage means pivotally mounting said contact-type obstacle sensor to said vehicle, said linkage means for permitting said contact-type obstacle sensor means to be rearwardly displaced relative to said vehicle in response to contacting the obstacle.

6. A vehicle comprising:
   contact-type obstacle sensor means carried by said vehicle for sensing the presence of an obstacle in a path of movement of said vehicle when said obstacle comes into contact with said obstacle sensor means and including (a) an electrically grounded metallic film, (b) an electrode plate, and (c) electrically conductive rubber means sandwiched between said film and electrode plate, said electrically conductive rubber means for exhibiting a decrease in electrical resistance in response to said obstacle sensing means coming into contact with the obstacle; and
   control means connected to said obstacle sensor means for sensing said decrease in electrical resistance of said electrically conductive rubber means and for stopping movement of said vehicle along said path in response thereto.

7. A vehicle as in claim 6 further comprising a noncontact-type sensor means connected to said control means, and wherein said control means includes means for reducing travelling speed of said vehicle in response to said noncontact-type sensor sensing an obstacle.

8. A vehicle as in claim 6 further comprising mounting means to mount said contact-type obstacle sensor means forwardly of said vehicle.

9. A vehicle as in claim 6 wherein said contact-type obstacle sensor means includes position-determining means to determine the position of contact of the obstacle with said contact-type obstacle sensor means.

10. A vehicle as in claim 9 wherein said position-determining means includes means dividing said electrode plate into a plurality of discrete electrode surfaces such that the position of the obstacle is determined in dependence upon the decrease of electrical resistance of that portion of said electrically conductive rubber means which opposes a respective one of said electrode surfaces, said respective one thereby being indicative of the contact position of said obstacle with said contact-type obstacle sensor means.

11. A vehicle comprising:
    means for supplying a reference voltage;
    a contact-type obstacle sensor means for sensing an obstacle in the vehicle's path of travel, said sensor means being carried by said vehicle and operatively connected to said reference voltage supplying means and including switching means for switching said reference voltage to ground in response to said sensor means coming into contact with an obstacle in the vehicle's path of travel; and
    control means connected to said switching means for sensing said reference voltage being switched to ground and for stopping travel of said vehicle in response thereto, wherein
    said switching means includes an electrically-grounded metallic film, an electrode plate connected to said reference voltage supplying means, and an electrically conductive rubber member means sandwiched between and in contact with said metallic film and said electrode plate, said rubber member means decreasing in electrical resistance in response to said sensor means coming into contact with an obstacle to thereby cause said reference voltage to be switched from said electrode plate to said electrically-grounded metallic film by allowing said reference voltage to be conducted therethrough.

* * * * *